United States Patent
Pyron

(10) Patent No.: US 7,638,713 B2
(45) Date of Patent: Dec. 29, 2009

(54) CONDUIT BODY ASSEMBLY WITH SEALED COVER

(75) Inventor: Roger Pyron, Arlington, TN (US)

(73) Assignee: Thomas & Betts International, Inc., Wilmington, DE (US)

(*) Notice: Subject to any disclaimer, the term of this patent is extended or adjusted under 35 U.S.C. 154(b) by 0 days.

(21) Appl. No.: 12/028,507

(22) Filed: Feb. 8, 2008

(65) Prior Publication Data

US 2008/0190662 A1 Aug. 14, 2008

Related U.S. Application Data

(60) Provisional application No. 60/901,117, filed on Feb. 13, 2007.

(51) Int. Cl.
*H02G 3/14* (2006.01)
(52) U.S. Cl. ...................... 174/91; 174/50.51
(58) Field of Classification Search .................. 174/91, 174/77 R, 50, 50.5, 50.51
See application file for complete search history.

(56) References Cited

U.S. PATENT DOCUMENTS

| | | | |
|---|---|---|---|
| 2,604,507 A | 7/1952 | Tyson | |
| 3,724,706 A | 4/1973 | Slocum | |
| 4,699,293 A * | 10/1987 | Duchrow | 220/378 |
| 4,791,258 A | 12/1988 | Youtz et al. | |
| 4,896,784 A | 1/1990 | Heath | |
| 5,621,189 A | 4/1997 | Dodds | |
| 5,843,532 A | 12/1998 | Dodds | |
| 6,711,033 B2 * | 3/2004 | Weiblen et al. | 361/816 |
| 6,838,615 B2 | 1/2005 | Pyron | |

* cited by examiner

*Primary Examiner*—Chau N Nguyen
(74) *Attorney, Agent, or Firm*—Hoffmann & Baron, LLP

(57) ABSTRACT

In an aspect of the subject invention, a conduit body assembly is provided. The conduit body assembly has a conduit body having a closed lower end, a side wall surrounding the lower end, the side wall including a planar perimetrical rim defining an open upper end. A cover is positionable over the perimetrical rim of the side wall for enclosing the open upper end. A sealing member is formed onto the cover for engagement against the planar rim of the side wall for effecting a seal therebetween.

9 Claims, 2 Drawing Sheets

CONDUIT BODY ASSEMBLY WITH SEALED COVER

RELATED APPLICATION

The present invention is a non-provisional application which corresponds to U.S. Provisional Application No. 60/901,117, filed on Feb. 13, 2007, and titled "CONDUIT BODY ASSEMBLY WITH SEALED COVER". The aforementioned application is incorporated herein by reference in its entirety.

FIELD OF THE INVENTION

The present invention relates generally to a conduit body assembly containing electrical wires. More particularly, the present invention relates to a conduit body assembly which provides an effective seal between the conduit body and a replaceable cover.

BACKGROUND OF THE INVENTION

Electrical conduit systems are used to provide electrical power to homes, commercial buildings and the like. These conduit systems often include long runs of rigid electrical conduit with frequent changes in direction. The conduit bodies are often installed in the conduit systems at various locations to provide access to the wires and to provide required change in direction in the conduit system.

The conduit body assemblies typically include a conduit body including openings at one or more ends which allow connection of the conduits and allow passage of the electrical wires therethrough. The conduit bodies are accessible through an open upper end for purposes of termination and the like. Typically, the cover is placed over the open upper end of the body. As the conduit bodies are formed of metal, the matching flat surfaces of the cover and the body provide little protection against the ingress of fluids, dust and other contaminants. Moreover, the mating surfaces may either be warped, cut or non-flat or possess flash from the manufacturing process leaving gaps when the cover is placed on the conduit body.

Certain of the conduit body assemblies include a coating therearound. These coated conduit body assemblies provide a superior environmental seal and protection for the conduit and connectors therein. Also, the coated conduit bodies provide a better seal between the cover and the body. However, when a cover must be replaced, as is often the case, the new cover may not provide an effective seal with the conduit body.

It is, therefore, desirable to provide a cover in a conduit body assembly which may be replaceable and provide a pliable convex seal between the cover and the conduit body.

SUMMARY OF THE INVENTION

The present invention provides a conduit body assembly. The conduit body assembly includes a conduit body having a closed lower end, a side wall surrounding the lower end. The side wall includes a planar perimetrical rim defining an open upper end. A cover is positionable over the perimetrical rim of the side wall for enclosing the open upper end.

The sealing member formed onto and extending from the cover is provided for engagement against the planar rim of the side wall for effecting a seal therebetween. The sealing member may be overmolded onto the cover and include a bead protruding perimetrically therefrom for engagement with the rim. In such a manner, the cover may extend away and/or from the cover.

The present invention also provides a cover for enclosing the open upper end of the conduit member where the conduit body includes a planar rim about the open upper end. The cover includes a cover member having a perimetrical cover surface for placement against the rim. A sealing member is affixed to the perimetrical surface of the cover body and may extend from the cover body for sealing engagement with the rim.

In preferred embodiments, the sealing member may be formed of polyvinyl chloride (PVC).

These and other features of the invention will be better understood through a study of the following descriptive and accompanying drawings.

DETAILED DESCRIPTION OF THE PREFERRED EMBODIMENT

The present invention provides a conduit body assembly for use in electrical systems such as electrical conduit systems. The conduit body assembly of the present invention provides a replaceable cover which may be placed in sealed engagement with a conduit body.

Figure 1:
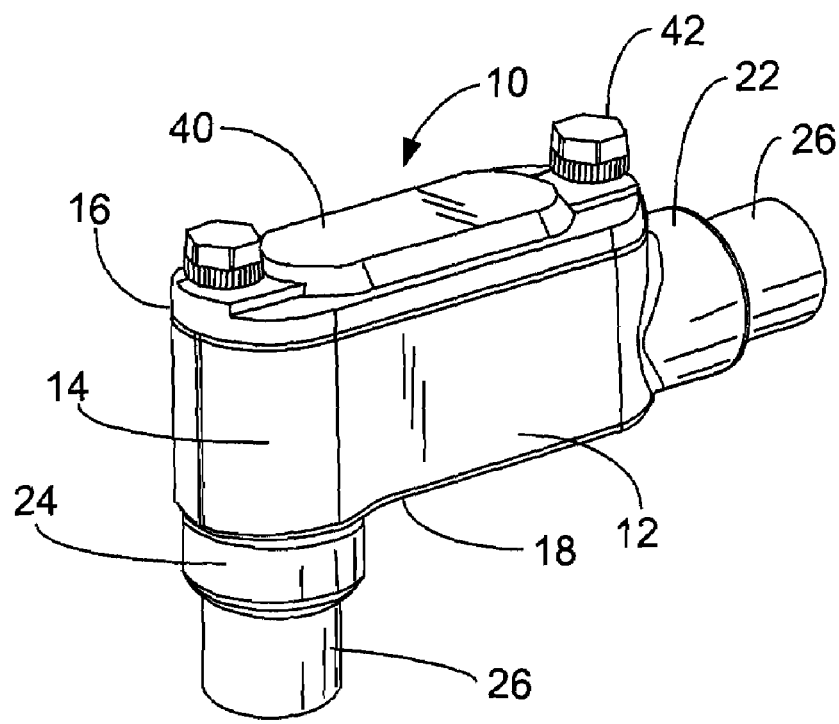
FIG. 1 is a perspective view of the conduit body assembly of the present invention.
Figure 2:
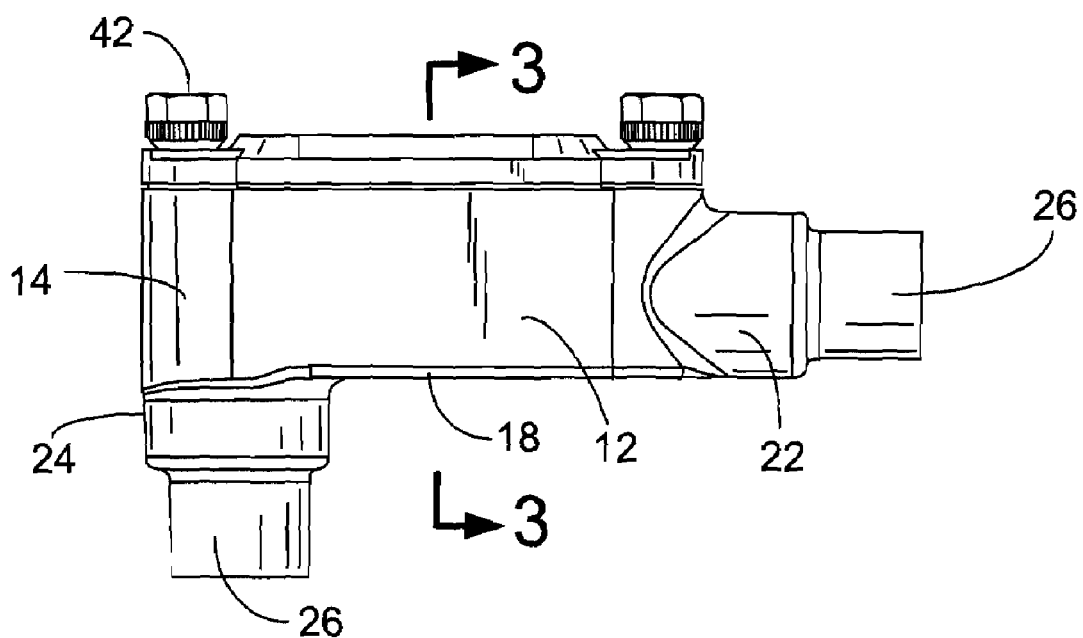
FIG. 2 is a side elevational view of the conduit body assembly of FIG. 1.

Referring to FIG. 1, the conduit body assembly 10 of the present invention includes a conduit body 12 which is of generally conventional construction. The conduit body is an elongate member having an upwardly extending side wall 14 having an open upper end 16 and a closed lower end 18 defining a conduit body interior 20 (shown in FIG. 3 and FIG. 4). The conduit body 12 includes a pair of hubs 22 and 24 in communication with the interior 20 which allow for ingress and egress of electrical wires therein through conduits 26 attached to the hubs 22 and 24.

Figure 3:
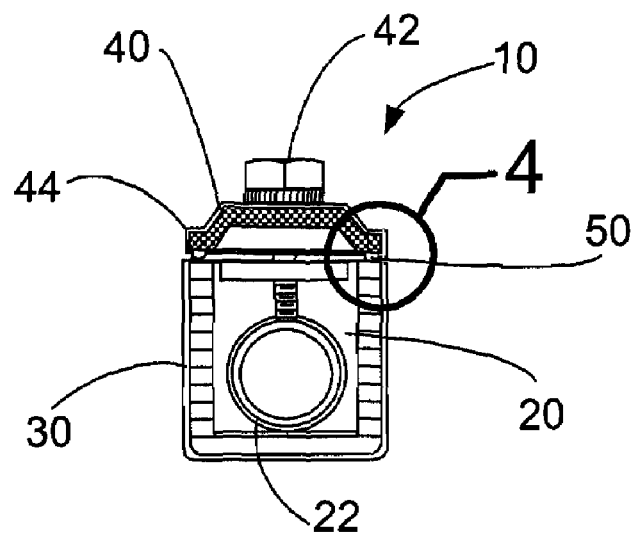
FIG. 3 is a sectional showing of the conduit body assembly of FIG. 2 taken through the line 3-3 thereof.
Figure 4:
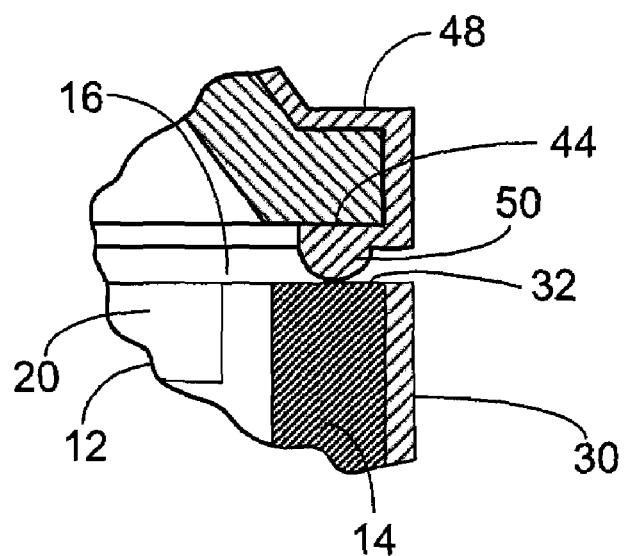
FIG. 4 is an enlarged view of section 4 of FIG. 3 showing the engagement between the cover and the conduit body of the conduit body assembly of the present invention.

As particularly shown in FIG. 3 and FIG. 4, conduit body 12 may include thereover a sealing coating 30 which provides an environmental seal to the conduit body preventing ingress of contaminates, dirt and moisture. The sealing coating 30 may be formed of a wide variety of materials such as, for example, polyvinyl chloride (PVC). The coating 30 covers the entire conduit body including the side walls 14 and closed lower end 18 with the exception of the upper surface of a rim 32 defined about the open upper end 16 of conduit body 12.

Referring to FIG. 1 and FIG. 3, the conduit body assembly 10 further includes a cover 40 which is positionable over the open upper end 16 of conduit body 12 to enclose the interior 20 thereof. The cover 40 is of generally conventional construction and may include fastening hardware 42 extending through opposite ends of the cover for securely attaching the cover 40 to the conduit body 12 as is well known in the art.

The cover 40 is generally a planar member having a depending perimetrical edge 44 thereabout. The edge 44 is designed for positioning over the perimetrical rim 32 of conduit body 12. The cover 40 may also include a sealing coating 48 thereabout. When positioned over conduit body 12, the cover 40 thereby provides a sealed enclosure for the interior 20 of conduit body assembly.

Referring to FIG. 3 and FIG. 4, the coating 48 of cover 40, in the preferred embodiment shown herein, includes a depending perimetrical bead 50 extending thereabout. Bead 50, which is preferably integrally formed with the coating 48, extends for engagement with the rim 32 of conduit body 12 so as to provide sealed engagement therewith. The bead 50 forms a pliable convex seal. As a result, the bead 50 will self-adjust and conform to the rim 32 of body 12. The pliable, self-adjusting confirming nature of the convex bead 50 helps assure sealing even when the rim 32 may be non-flat, warped or have excess flash thereover.

In the present illustrative embodiment, bead 50 is formed integrally with coating 48 in an overmolded process. However, the present invention is not limited thereto. Bead 50 may be provided separately from the covering 48 or may be employed where there is no sealing coating over cover 40. Various well known techniques may be employed to apply the bead 50 to the edge 44 of cover 40.

In many instances, the cover 40 is replaceable with respect to a conduit body 12. Thus, once a cover is removed to allow access to the interior of the conduit body, it is replaced by a new cover. This may be caused in part by the need for replacement of the cover with a cover having a higher agency rating so as to offer more protection against ingress of fluids, dust, etc. The replaceable cover 40 of the present invention provides a sealing bead 50 which assures sealed engagement with the rim 32 of the conduit body 12. This allows the conduit body assembly to achieve a higher agency rating while using the existing conduit body.

A number of embodiments of the invention have been described. Nevertheless, it will be understood that various modifications may be made without departing from the spirit and scope of the invention. Also, the features and elements described above may be modified in various than described above, where appropriate. Accordingly, alternative embodiments are within the scope of the following claims.

What is claimed is:

1. A conduit body assembly:
    a conduit body having a closed lower end, a side wall surrounding said lower end, said side wall including a planar perimetrical rim defining an open upper end;
    a cover positionable over said perimetrical rim of said side wall for enclosing said open upper end; and
    an integral coating formed about an outer surface of said cover and having a sealing member extending therefrom for engagement against said planar rim of said side wall for effecting a seal therebetween wherein said sealing member includes an elongate bead protruding from said cover.

2. A conduit body assembly of claim 1 wherein said sealing member is over molded onto said cover.

3. A conduit body assembly of claim 1 wherein said side wall and said bottom wall of said conduit body includes a covering molded thereabout, and wherein said sealing bead of said cover is in engagement with said rim having no covering thereover.

4. A conduit body assembly of claim 3 wherein said bead is convex in configuration.

5. A conduit body assembly of claim 3 where the bead is pliable.

6. A cover for enclosing an open upper end of a conduit body, said conduit body having a planar rim about said open upper end, said cover comprising:
    a cover member having perimetrical cover surface for placement against said rim; an integral coating formed about an outer surface of said cover and having a sealing member extending therefrom at said perimetrical cover surface for sealing engagement with said rim, wherein said sealing member includes a bead extending from said cover surface.

7. A cover of claim 6 wherein said sealing member is over molded onto said cover member.

8. A cover of claim 6 wherein said bead is pliable.

9. A cover of claim 8 wherein said sealing member is formed of polyvinyl chloride.

* * * * *